UNITED STATES PATENT OFFICE.

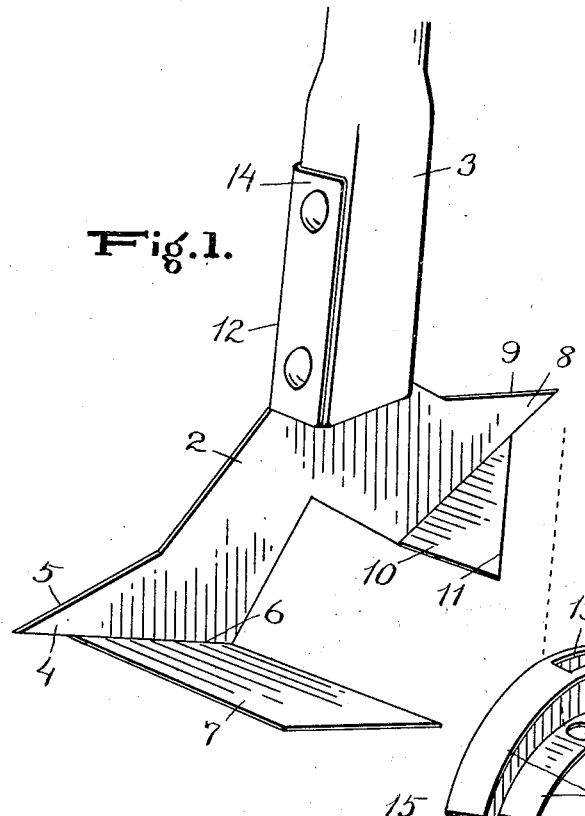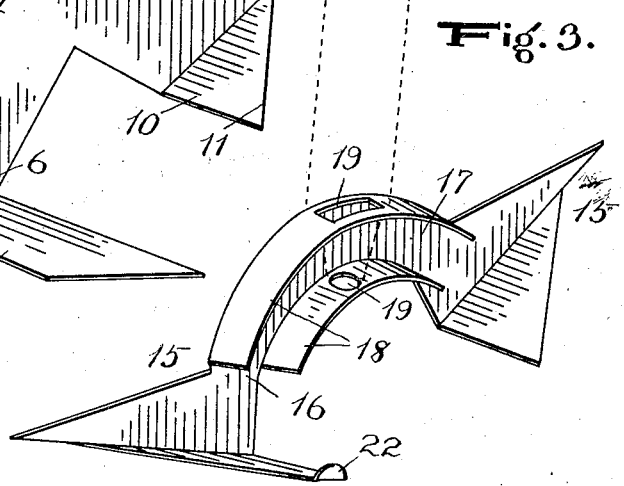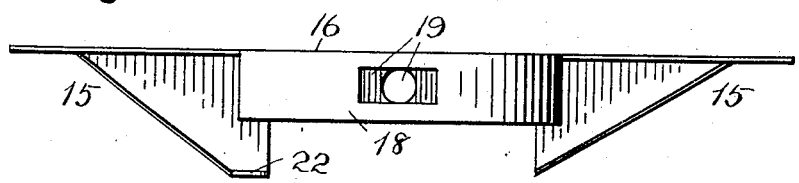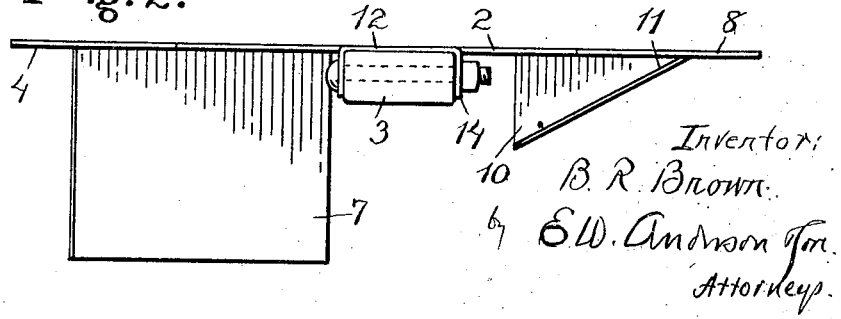

BENJAMIN R. BROWN, OF KINSLEY, KANSAS.

SOIL-WORKING IMPLEMENT.

1,328,121.     Specification of Letters Patent.     Patented Jan. 13, 1920.

Application filed November 8, 1918. Serial No. 261,675.

*To all whom it may concern:*

Be it known that I, BENJAMIN R. BROWN, a citizen of the United States, resident of Kinsley, in the county of Edwards and State of Kansas, have made a certain new and useful Invention in Soil-Working Implements; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a perspective view of the implement.

Fig. 2 is a plan view of the same.

Fig. 3 is a perspective view of a modification.

Fig. 4 is a plan view of the same.

The invention has relation to a combined weeder and hoe, and it consists in the novel construction and combinations of parts, as hereinafter set forth.

In the accompanying drawings, illustrating the invention, the numeral 2 designates the body of the tool, attached to a handle 3, and provided with a point portion 4 having an inclined cutting edge 5 and being adapted to make a vertical cut in the soil, said body being bent at right-angles at 6 to provide a hoe blade 7, located in use above said point portion. In this way the soil will be first entered by the point portion to make a vertical cut, and thereafter the hoe blade will enter the soil in the usual manner of a hoe, the point portion continuing to cut vertically in the lower soil while the hoe blade is cutting.

Preferably the body 2 will be extended to the opposite side of the handle and provided with a point portion 8, in the same plane as the point portion 4, and having an inclined cutting edge 9, a cultivator blade 10 being joined to this point portion and provided with an inclined cutting edge 11, and having an inclination as a whole opposite to the inclination of the hoe blade.

In a tool having a hoe head at one side of the handle and a cultivator head at the other side, as shown in Fig. 1 of the drawings, the body 2 will extend centrally of the two heads, upwardly at 12 for connection with the handle 3, the upward extension having lateral flanges 14 to brace the handle connection.

A lighter tool is shown in Figs. 3 and 4 of the drawings, being adapted for use with one hand, and having two heads 15, similar to those already described, but both of which are preferably provided with cultivator blades rather than one with a hoe blade and the other with a cultivator blade. The body 16 of this tool is arched at 17 to connect the two heads, and is thereby adapted to serve as a handle, this body having arcuate lateral flanges 18, to further adapt it for use as a handle. These flanges are usually provided with alined perforations 19, wherein the end of a handle may be inserted and secured, should a long handle of the usual nature be desired.

The cultivator blade at one side of the tool may be provided with a small upturned outer rear flange 22, parallel to the body of the tool, and adapted to serve as a guide in working close to the plants at this side.

The invention is found very useful in thinning plants without using the hands, and in any place where a hoe or cultivator is needed, the work being expedited and performed more thoroughly.

I claim: —

1. In a hoe, a handle, a main hoe blade having a lateral extension at right-angles thereto, said lateral extension having a lower point projecting below and lying substantially in the plane of said main blade and adapted for making a lateral vertical cut in the soil prior to the entry into the soil of the main blade, whereby the cut of the latter is made easier.

2. In a hoe, a handle, a main hoe blade having a lateral extension at right-angles thereto, said lateral extension having a lower point projecting below said main blade and adapted for making a lateral vertical cut in the soil prior to the entry into the soil of the main blade, whereby the cut of the latter is made easier, said lateral extension being substantially in the plane of and secured to said handle.

In testimony whereof I affix my signature in presence of two witnesses.

BENJAMIN R. BROWN.

Witnesses:
    G. E. WILSON,
    T. S. WILLIAMS.